United States Patent [19]

Tanaka et al.

[11] Patent Number: 5,028,393

[45] Date of Patent: Jul. 2, 1991

[54] AL-BASED ALLOY FOR USE AS SLIDING MATERIAL, SUPERIOR IN FATIGUE RESISTANCE AND ANTI-SEIZURE PROPERTY

[75] Inventors: Tadashi Tanaka, Konan; Masaaki Sakamoto, Nagoya; Yoshiaki Sato, Gifu; Tohru Kato, Seto, all of Japan

[73] Assignee: Daido Metal Company, Nagoya, Japan

[21] Appl. No.: 511,367

[22] Filed: Apr. 19, 1990

[30] Foreign Application Priority Data

Jun. 2, 1989 [JP] Japan .................................. 1-140284

[51] Int. Cl.$^5$ ........................ C22C 21/10; C22C 21/08
[52] U.S. Cl. .................................... 420/531; 420/532; 420/535; 148/439
[58] Field of Search ............... 420/531, 532, 534, 535, 420/536, 537, 549, 554; 428/652; 148/439

[56] References Cited

U.S. PATENT DOCUMENTS

| | | | |
|---|---|---|---|
| 4,412,870 | 11/1983 | Vernam et al. | 148/439 |
| 4,711,762 | 12/1987 | Vernam et al. | 148/439 |

FOREIGN PATENT DOCUMENTS 62-038796  2/1987  Japan .

Primary Examiner—Melvyn J. Andrews
Assistant Examiner—Robert R. Koehler
Attorney, Agent, or Firm—Browdy and Neimark

[57] ABSTRACT

Disclosed in an Al-based alloy for use as sliding material, superior in fatigue resistance and anti-seizure property consisting, by weight, of 1–10% Zn, 1–15% Si, 0.1–5% Cu, 0.1–5% Pb, 0.005–0.5% Sr, and the balance Al and incidental impurities.

4 Claims, 3 Drawing Sheets

FIG. 1

| TYPE OF PRODUCT | SPECIMEN NO. | RESULT OF FATIGUE TEST |||||
|---|---|---|---|---|---|---|
| | | FATIGUE LOAD OF BEARING (kgf/cm²) |||||
| | | 400 | 450 | 500 | 550 | |
| PRODUCT OF PRIOR ART | 1 | →  | | | | |
| | 2 | →  | | | | |
| | 3 | | → | | | |
| | 4 | →  | | | | |
| | 5 | | → | | | |
| | 6 | | → | | | |
| | 7 | | | | → | NO FATIGUE |
| | 8 | | | → | | |
| | 9 | | | | → | NO FATIGUE |
| | 10 | | | | → | NO FATIGUE |
| | 11 | | | | → | NO FATIGUE |
| | 12 | | | → | | |
| | 13 | | | → | | |
| | 14 | | | | → | NO FATIGUE |
| | 15 | | | → | | |
| PRODUCT OF THE INVENTION | 16 | | | → | | |
| | 17 | | | → | | |
| | 18 | | | → | | |
| | 19 | | | → | | |
| | 20 | | | → | | |
| | 21 | | | | → | NO FATIGUE |
| | 22 | | | | → | NO FATIGUE |
| | 23 | | | | → | NO FATIGUE |
| | 24 | | | | → | NO FATIGUE |
| | 25 | | | | → | NO FATIGUE |
| | 26 | | | | → | NO FATIGUE |
| | 27 | | | | → | NO FATIGUE |
| | 28 | | | | → | NO FATIGUE |
| | 29 | | | | → | NO FATIGUE |
| | 30 | | | | → | NO FATIGUE |

AL-BASED ALLOY FOR USE AS SLIDING MATERIAL, SUPERIOR IN FATIGUE RESISTANCE AND ANTI-SEIZURE PROPERTY

BACKGROUND OF THE INVENTION

This invention relates to an Al-based alloy for use as sliding material, superior in fatigue resistance and anti-seizure property. More particularly, the invention concerns an Al-based alloy for use as sliding material, superior in fatigue resistance and anti-seizure property, which is applied for half bearings of slide bearings, cylinder bushes, flanged bearings, thrust washers, etc., and which is suitable for applications in a wide industrial field including vehicles and industrial machines in particular equipped with high-load bearings.

STATEMENT OF THE RELATED ART

The prior art techniques which relate to this invention includes ones which are disclosed in, for example, West-German Patent Nos. 1,533,413 and 1,5578,696, the Specification of U.S. Pat. No. 4,170,469, and the Specification of British Patent No. 1,593,006. These disclosures are each concerned with Al-based alloys for use as materials of bearings, each alloy consisting, by weight, of 0.1-10% Zn, 0.1-20% Si, 0.1-10% Cu, and 0.1-10% Pb as essential components, 0.1-7% of at least one component selected, as an optional additive, from the group consisting of Ni, Bi and Mg, and the balance Al.

Internal combustion engines, mainly for automobiles have in recent years been rapidly advanced and have tendency to be further increased in speed and load applied. Therefore, even when the above-mentioned prior art Al-based alloys for use as sliding material are employed as the materials of bearings for higherspeed internal combustion engines in particular, the film of a lubricating oil comes to be thinned. Consequently, there has occurred a drawback that they are inferior in fatigue resistance as well as anti-seizure property.

SUMMARY OF THE INVENTION

Accordingly, an object of this invention is to provide an Al-based alloy for use as sliding material, which is superior in both fatigue resistance and anti-seizure property, thus eliminating the drawbacks inherent in the conventional Al-based alloys for use as sliding material.

The Al-based alloys which can attain the above object are the following four types of Al-based alloys:

(1) An Al-based alloy for use as sliding material, superior in both fatigue resistance and anti-seizure property consisting, by weight, of 1-10% Zn, 1-15% Si, 0.1-5% Cu, 0.1-5% Pb, 0.005-0.5% Sr, and the balance Al and incidental impurities.

(2) An Al-based alloy for use as sliding material, superior in both fatigue resistance and anti-seizure property consisting, by weight, of 1-10% Zn, 1-15% Si, 0.1-5% Cu, 0.1-5% Pb, 0.005-0.5% Sr, 0.05-5% in total of at least one component selected from the group A consisting of 0.05-5% Mg and 0.05-5% Ni, and the balance Al and incidental impurities.

(3) An Al-based alloy for use as sliding material, superior in both fatigue resistance and anti-seizure property consisting, by weight, of 1-10% Zn, 1-15% Si, 0.1-5% Cu, 0.1-5% Pb and 0.005-0.5% Sr, 0.05-2% in total of at least one components selected from the group B consisting of 0.05-2% Mn, 0.05-2% V, 0.05-2% Cr, and the balance Al and incidental impurities.

(4) An Al-based alloy for use as sliding material, superior in both fatigue resistance and anti-seizure property consisting, by weight, of 1-10% Zn, 1-15%Si, 0.1-5% Cu, 0.1-5% Pb and 0.005-0.5% Sr, 0.05-5% in total of at least one component selected from the group A consisting of 0.05-5% Mg and 0.05-5% Ni, 0.05-2% in total of at least one component selected from the group B consisting of 0.05-2% Mn, 0.05-2% V and 0.05-2% Cr, the total contents of said groups A and B being in a range of 0.05 to 4% and the balance Al and incidental impurities.

Next, the reasons for restricting the components of each Al-based alloy for use as sliding material, superior in fatigue resistance and anti-seizure property according to this invention, to the ranges described in Claims (1) to (4) (the reasons for determining the upper and lower limits of the content of each said alloy component) will be explained below together with the function thereof.

(1) Si: 1 to 15 wt %

(a) When fine grains of Si having high hardness (about 600 Hv) are dotted in the matrix of Al, only the Al matrix having a soft surface is worn. Consequently, the surface of the alloy is in the form of irregularities as viewed microscopically. Thus, the convex silicon grains resist a high load with their non-adhesion property being maintained as it stands while the concave portions play the role as of oil reservoirs. Thus, the alloy has resistance to high load, to thin oil film, and further to contact with metal.

(b) The Si grains which are finely dotted serve to abrade edges, burrs, etc. of the surface of the mating shaft so as to improve the anti-seizure property. In this case, when the Si grains are coarse, there is the risk of their locally overabrading the shaft as well as of their being taken away. This requires control or limitation of their size.

(c) When metallic contact is instantaneously made between the Al matrix and the mating shaft, seizure and fluidity of the alloy bearing are prevented because of non-adhesion property of silicon in the alloy surface and the non-flowability of the Al matrix having Si as the core thereof.

(d) Where the content of silicon is less than 1%, the alloy fails to exhibit wear resistance as well as the advantageous properties shown in the above items (a), (b) and (c). Where the content of silicon exceeds 15%, the alloy becomes brittle, inferior in strength against impact fatigue, and deficient in toughness, so that the alloy is low in plastic workability at the time of production such as rolling, extruding, etc.

Preferably, the silicon content is in the range of 3 to 8 wt %.

(2) Zn: 1 to 10 wt %

(a) Zn is in solid-solution state in the Al matrix to thereby vary the lattice spacings thereof, so that a the adhesion property thereof is reduced.

(b) Zn is preferentially oxidized in comparison with aluminum to obviate the harmness of a hard Al oxide film.

(c) Zn acts to increase the compatibility of the alloy with lubricating oil.

(d) Where the content of zinc is less than 1 wt %, the alloy becomes inferior in wear resistance as well as in anti-seizure property. Where the content of zinc exceeds 10 wt %, there occurs such a risk that the alloy bearing is apt to cause a stress corrosion cracking, and at the same time becomes inferior in toughness. Besides, in a case where soft material such as an overlay is applied onto the surface of the alloy, there occurs difficulty in making adhesion of, for example, an electric plating layer. Besides, in this case, there occur adverse influence on bondability obtained by roll-bonding.

Preferably, the zinc content is in the range of 2 to 8 wt %.

(3) Cu: 0.1 to 5 wt %

(a) The addition of Cu increases the strength of Al matrix, and is very effective in raising the fatigue resistance. However, if the alloy becomes too high in hardness, a problem arises in respect of compatibility. the same thing applies to Ni as well.

(b) If the content of Cu is less than 0.1%, no significant advantage is brought about by Cu. Where the content of Cu exceeds 5%, the alloy becomes excessively high in hardness with the result that the compatibility decreases and the toughness also decreases.

Preferably, the Cu content is in the range of 0.5 to 2 wt %.

(4) Pb: 0.1 to 5 wt %

The addition of Pb improves the machinability as well as the anti-seizure property of the alloy. However, where the content of Pb is less than 0.1 wt %, no significant effect is obtained by the addition of Pb. Where the content of Pb is above 5 wt %, it becomes very difficult to obtain uniform dispersion of Pb into the Al matrix, and the strength of the alloy is influenced adversely.

Preferably, Pb content is between 0.5 wt % and 3 wt %.

(5) Sr: 0.005 to 0.5 wt %

(a) Sr serves to finely crystallize the grains of silicon.

(b) Sr improves the mechanical property, particularly the elongation of the alloy.

(c) In a case where Sr is less than 0.005 wt %, no significant advantage is brought about by addition of Sr. In a case where Sr is more than 0.5 wt %, the ductility of the alloy decreases.

Preferably, Sr content is between 0.01 wt % and 0.1 wt %.

(6) Mg and/or Ni selected from the group A: 0.05 to 5 wt %

(a) Mg and/or Ni is in solid-solution state in Al matrix, or is precipitated in the form of intermetallic compound, thereby increasing the fatigue strength thereof.

(b) In a case where Mg and/or Ni is less than 0.05 wt %, no substantial effect is obtained by addition of Mg and/or Ni. In a case where Mg and/or Ni is more than 5 wt %, the alloy becomes excessively high in hardness, so that it becomes inferior in the compatibility, and the toughness of the alloy decreases.

Preferably, the content of Mg and/or Ni is 0.1 wt % to 3 wt %.

(7) At least one component selected from the group B consisting of Mn, V and Cr: 0.05 to 2 wt %

(a) The component or components are in solidsolution state in Al matrix, or are precipitated in the form of intermetallic compounds, thereby improving the mechanical property of the alloy under high temperature. And, (b) Where the content of the component or components is less than 0.05 wt %, no substantial advantage is obtained by addition thereof. In a case of more than 2 wt %, the grains of the intermetallic compounds become coarse in size with the result that the alloy becomes brittle.

(8) the total content of the components selected from the groups A and B: 0.05 to 4 wt %

(a) The components are in solid-solution state in Al matrix, or are precipitated in the form of intermetallic compounds, thereby improving the resistance to fatigue.

(b) Where the total content is less than 0.05 wt %, no substantial effect is obtained. Where the total content exceeds 4 wt %, the alloy becomes too high in hardness, so that the alloy becomes inferior in the compatibility and the toughness thereof also decreases.

Preferably, the total content thereof ranges between 0.1 wt % and 3 wt %.

BRIEF DESCRIPTION OF THE DRAWINGS

FIG. 1 shows a table showing the results of a fatigue test concerning respective composite bearings of the prior art and this invention;

DESCRIPTION OF THE PREFERRED EMBODIMENT

Figure 3:
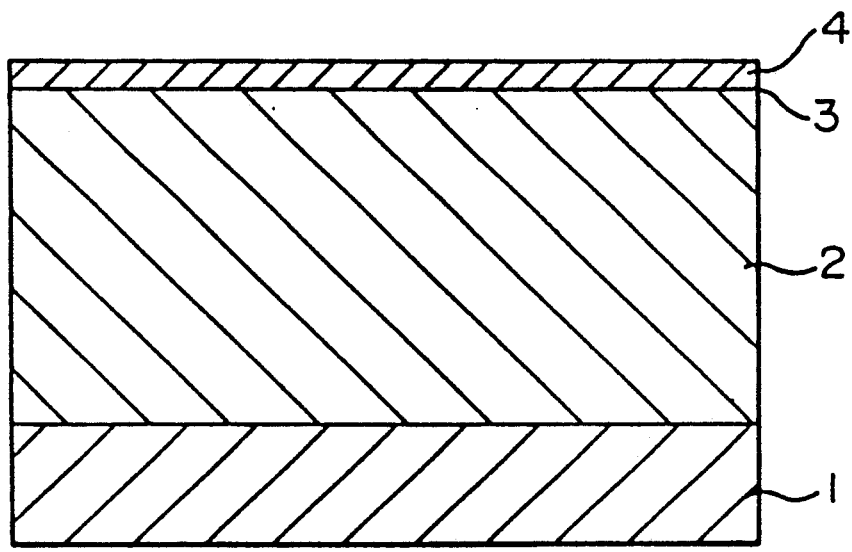
FIG. 3 is a sectional view of a part of a composite bearing which view is depicted from a photograph of microstructure of the composite bearing produced by a preferred embodiment of this invention, the photograph being taken with a magnification of 100.

In FIG. 3, the reference numeral 1 indicates a steel backing layer, 2 being a bearing alloy layer, 3 being an intermediate layer, and 4 being an overlay.

The product of this invention will now be described in detail by way of the following Examples while compared with conventional products.

EXAMPLE 1

Figure 2A:
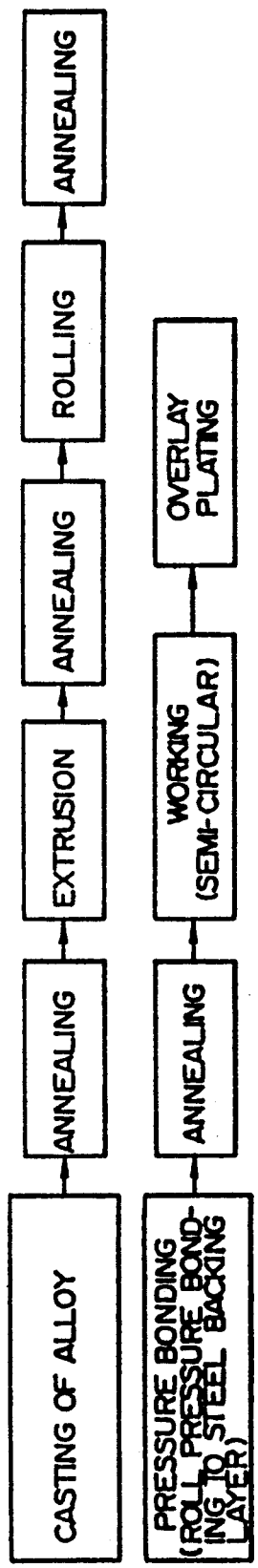
FIGS. 2(a) and 2(b) are block diagrams showing basic processes for manufacturing composite bearings according to this invention, respectively.

Alloys Nos. 16 to 30 according to this invention and comparative alloys Nos. 1 to 15, both being shown in Table 2, were each cast at a temperature of 750° C. to 850° C. into rods having a diameter of 10 inches. After each of the rods had been annealed at a temperature of 400° C. to 500° C., it was extruded into a sheet at the extrusion ratio of 35 to 45. This sheet was annealed at a temperature of 350° C. to 450° C. and then was rolled to a rolled member. Thereafter, the rolled member was annealed at a temperature of 300° C. to 400° C. and then was roll-bonded under pressure onto a steel backing at the reduction rate of 30 to 50%, thus obtaining a bimetal member. This bimetal member was annealed at a temperature of 300° C. to 400° C. and then was plastically worked into a semi-circular shape. This semi-circularly plastically worked member was plated, on its inner surface, with a Pb-10% Sn alloy having a thickness of 10 to 20 microns to provide an overlay. Thus, a semi-circular composite bearing was obtained. The process of manufacturing this composite bearing is shown in FIG. 2(a) while a section of a part of the composite bearing is shown in FIG. 3.

The fatigue test and seizure test were conducted under the conditions shown in Table 1 regarding said semi-circular composite bearings, the results of the former test being shown in FIG. 1 while the results of the latter test are shown in Table 3 each sample being tested three times.

Further, the bimetal members prior to the plastic working into the semi-circular shape were tested regarding their mechanical properties, the results being shown in Table 2. Among these mechanical properties, the adhesion strength was tested in the following manner. Namely, bimetal members each having a width of B (mm) were prepared. Then, there were formed two parallel grooves with an interval of L mm on the bimetal member, one of which grooves extends from the outer surfaces of the bearing alloy layer to the interface of the bonding, another of which grooves extendeds from the outer surface of the steel backing to the interface of the bonding. Then, respective ends of the two test pieces at the opposite sides were pulled in opposite direction. Then, the pulling load as measured when the steel backing layer was peeled off from the bearing alloy layer was divided by an bonding area of B×L (mm$^2$) to determine the bonding strength.

EXAMPLE 2

Figure 2B:
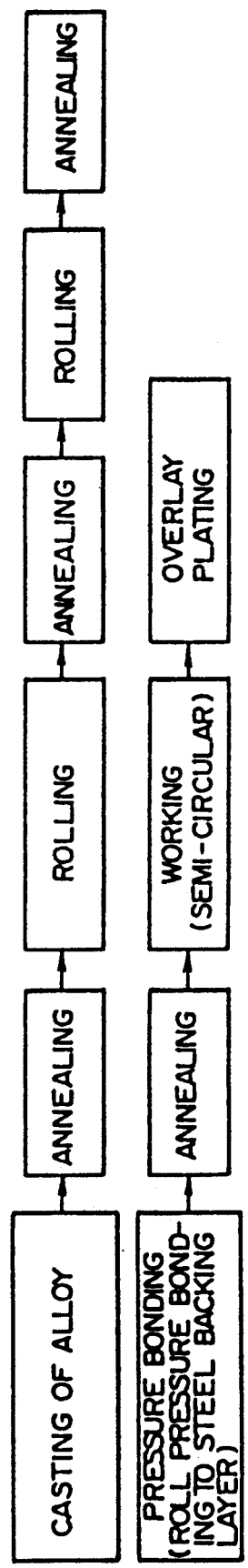

Bimetal members each having the same shape as in Example 1 were prepared and composite bearings each having the same shape as in Example 1 were prepared from said bimetal members, in the process of FIG. 2(b), under the same conditions, and using the same alloy, as in Example 1 of which the process steps are shown in FIG. 2(a), with the exception that, instead of the extrusion and the annealing after the extrusion shown in FIG. 2(a), there were used a rolling step and an annealing of 300° C. to 400° C., respectively. the same tests as in Example 1 were conducted regarding the bimetal members and composite bearings thus prepared, the results being substantially the same as in Example 1.

In Examples 1 and 2 and with reference to FIG. 3, an intermediate Ni-plated layer having a thickness of 1.5 microns was provided between the bearing alloy layer 2 and the overlay 4 in order to obtain bonding strength therebetween. This intermediate layer 3 may be also provided by using Cu or a Cu alloy in lieu of Ni. Further, in Examples 1 and 2, the steel backing layer 1 and the bearing alloy layer 2 were directly pressure-bonded to each other. It is well known, however, that mutual pressure bonding of both the layers 1 and 2 with a Ni plating or Al foil interposed therebetween improves the bonding strength to a larger extent.

This invention has the following excellent advantages.

(A) The alloy of this invention has improved fatigue resistance and anti-seizure property as compared with the conventional alloys (see FIG. 1 and Table 3)

(B) In the bearing properties, anti-seizure (non-fluidity and non-adhesion) property in particular is remarkably improved because of the respective actions of Al matrix in which Zn is in solid-solution state, Si finely crystallized and dispersed by addition of Sr, and Pb dispersed in Al matrix. And, (C) In view, particularly, of the fact that, since, coarse, Si grains cause damages to the mating shaft when in use, the size of Si crystal grains is limited to 15 microns or less by adding a small amount of Sr in the case of the present invention. Thus, it is possible to improve the anti-seizure property to a larger extent than in the case of conventional alloys.

TABLE 1A

| Conditions For The Test Fatigue Test | |
| --- | --- |
| Test Method | Soda Type Dynamic Load Test Method |
| Number Of Rotations | 4000 r.p.m. |
| Testing Time Period | 20 Hr |
| Circumferential Speed | 13 m/sec |
| Oil-Feeding Temperature | 120° C. |
| Oil-Feeding Pressure | 3 kg/cm$^2$ |
| Lubricating Oil | SAE 20 |
| Angle At Which Oil Is Fed | Advanced Angle: 36° |
| Evaluation Method For Fatigue | "Fatigue" is deemed to have occurred when fatigue has occurred in regard to the bearing area of not less than 5% |

TABLE 1B

| Conditions For Test Seizer Test | |
| --- | --- |
| Test Method | Sapphire Test Method |
| Number Of Rotations | 3250 r.p.m. |
| Circumferential Speed | 9.0 m/sec |
| Oil-Feeding Temperature | 90 to 95° C. |
| Oil-Feeding Pressure | 4.5 kg/cm$^2$ |
| Amount Of Oil To Be Fed | 20 cc/min |
| Oil Clearance | 0.04 to 0.06 mm |
| Lubricating Oil | SAE 20 |
| Method Of Applying Load | After idle operation of 15 min. under no load, the motor is run for 10 min. under a load of 700 kgf/cm$^2$. Thereafter, the load is stepwise increased 70 kgf/cm$^2$ for each 10-minute passage (up to 1610 kgf/cm$^2$) |
| Method Of Deciding The Time Of Seizure Occurrence | "Seizure" is deemed to have occurred when the temperature of rear surface of the bearing has increased to 200° C. or more, or when the motor has been overloaded. |

TABLE 2

| Type of Sample | Sample No. | Chemical Composition of Bearing Alloy (wt %) | | | | | | | | | | Mechanical Property | | | | Structure of Bearing |
| --- | --- | --- | --- | --- | --- | --- | --- | --- | --- | --- | --- | --- | --- | --- | --- | --- |
| | | Al | Si | Zn | Cu | Pb | Sr | Mg | Ni | Mn | V | Cr | Tensile Strength kgf/mm$^2$ | Elongation % | Bonding Strength kg/mm$^2$ | Hardness Hv 5 | |
| Prior Art | 1 | balance | 1 | 10 | 3 | 1 | — | — | — | — | — | — | 26 | 15 | 8.0 | 62 | Steel Backing Layer + Bearing Alloy Layer + Overlayer (Surface Layer) The overlayer consist of 10% Sn and 90% Pb. |
| | 2 | " | 1 | 8 | 2 | 0.3 | — | — | — | — | — | — | 24 | 16 | 8.5 | 60 | |
| | 3 | " | 2 | 8 | 1 | 4 | — | — | — | — | 0.15 | — | 23 | 16 | 8.5 | 59 | |
| | 4 | " | 2 | 7 | 0.5 | 1.5 | — | — | 1 | — | 1 | — | 23 | 19 | 8.5 | 55 | |
| | 5 | " | 3 | 4 | 1 | 1 | — | — | — | — | — | — | 18 | 27 | 10.0 | 45 | |
| | 6 | " | 3 | 6 | 5 | 1.5 | — | — | — | — | — | — | 26 | 9 | 9.0 | 64 | |
| | 7 | " | 4 | 6 | 1.5 | 3 | — | — | 0.1 | — | 1.5 | 1 | 24 | 11 | 9.5 | 61 | |
| | 8 | " | 4 | 5 | 1.5 | 0.5 | — | 4 | — | 1 | — | — | 23 | 17 | 10.0 | 62 | |
| | 9 | " | 6 | 5 | 2 | 2 | — | 1 | — | 1.5 | — | 0.1 | 24 | 18 | 9.5 | 64 | |
| | 10 | " | 6 | 4 | 1.2 | 1 | — | 0.5 | — | — | — | — | 19 | 20 | 10.0 | 56 | |
| | 11 | " | 6 | 4 | 0.8 | 0.5 | — | 0.1 | 4 | 0.1 | 0.1 | 1.5 | 29 | 10 | 9.5 | 65 | |
| | 12 | " | 8 | 3 | 0.5 | 5 | — | — | — | — | — | — | 23 | 14 | 9.0 | 63 | |

TABLE 2-continued

| Type of Sample | Sample No. | Chemical Composition of Bearing Alloy (wt %) | | | | | | | | | | Mechanical Property | | | | Structure of Bearing |
|---|---|---|---|---|---|---|---|---|---|---|---|---|---|---|---|---|
| | | Al | Si | Zn | Cu | Pb | Sr | Mg | Ni | Mn | V | Cr | Tensile Strength kgf/mm² | Elongation % | Bonding Strength kg/mm² | Hardness Hv 5 |
| | 13 | " | 10 | 2 | 0.2 | 3 | — | — | — | — | — | — | 27 | 10 | 9.0 | 64 | |
| | 14 | " | 13 | 1 | 0.2 | 2 | — | — | — | — | — | — | 29 | 8 | 9.5 | 65 | |
| | 15 | " | 15 | 1 | 0.1 | 0.1 | — | — | — | — | — | — | 29 | 6 | 9.5 | 64 | |
| The | 16 | " | 1 | 10 | 3 | 1 | 0.008 | — | — | — | — | — | 25 | 16 | 8.5 | 63 | |
| Present | 17 | " | 1 | 8 | 2 | 0.3 | 0.01 | — | — | — | — | — | 25 | 16 | 8.5 | 58 | |
| Invention | 18 | " | 2 | 8 | 1 | 4 | 0.01 | — | — | — | 0.15 | — | 21 | 18 | 9.0 | 58 | |
| | 19 | " | 2 | 7 | 0.5 | 1.5 | 0.04 | — | 1 | — | 1 | — | 23 | 20 | 8.5 | 53 | |
| | 20 | " | 3 | 4 | 1 | 1 | 0.04 | — | — | — | — | — | 16 | 28 | 9.5 | 43 | |
| | 21 | " | 3 | 6 | 5 | 1.5 | 0.1 | — | — | — | — | — | 28 | 8 | 10.5 | 61 | |
| | 22 | " | 4 | 6 | 1.5 | 3 | 0.2 | — | 0.1 | — | 1.5 | 1 | 23 | 11 | 9.0 | 62 | |
| | 23 | " | 4 | 5 | 1.5 | 0.5 | 0.2 | 4 | — | 1 | — | — | 21 | 16 | 9.5 | 62 | |
| | 24 | " | 6 | 5 | 2 | 2 | 0.05 | 1 | — | 1.5 | — | 0.1 | 25 | 18 | 10.0 | 63 | |
| | 25 | " | 6 | 4 | 1.2 | 1 | 0.04 | 0.5 | — | — | — | — | 20 | 21 | 10.5 | 55 | |
| | 26 | " | 6 | 4 | 0.8 | 0.5 | 0.1 | 0.1 | 4 | 0.1 | 0.1 | 1.5 | 28 | 12 | 10.0 | 64 | |
| | 27 | " | 8 | 3 | 0.5 | 5 | 0.2 | — | — | — | — | — | 24 | 15 | 9.5 | 63 | |
| | 28 | " | 10 | 2 | 0.2 | 3 | 0.2 | — | — | — | — | — | 26 | 11 | 9.0 | 65 | |
| | 29 | " | 13 | 1 | 0.2 | 2 | 0.3 | — | — | — | — | — | 28 | 8 | 10.0 | 64 | |
| | 30 | " | 15 | 1 | 0.1 | 0.1 | 0.5 | — | — | — | — | — | 29 | 7 | 9.0 | 63 | |

TABLE 3

| Type of Sample | Sample No. | Maximum Load Just Before Seizure Seizure Load of Bearing (kgf/cm²) | | | | | | | |
|---|---|---|---|---|---|---|---|---|---|
| | | 1120 | 1190 | 1260 | 1330 | 1400 | 1470 | 1540 | 1610 |
| Prior Art | 1 | | | | | | o | oo | |
| | 2 | | | | | | o | oo | |
| | 3 | | | | | | o | o | o |
| | 4 | | | | | | o | oo | |
| | 5 | | | | | | | o | oo |
| | 6 | | | | | | o | oo | |
| | 7 | | | | | | | oo | o |
| | 8 | | | | | | | oo | o |
| | 9 | | | | | | o | o | o |
| | 10 | | | | | | | oo | o |
| | 11 | | | | | o | oo | | |
| | 12 | | | | | | o | oo | |
| | 13 | | | | | | o | oo | |
| | 14 | | | | | | oo | o | |
| | 15 | | | | | o | o | o | |
| The | 16 | | | | | | ooo | | |
| Present | 17 | | | | | | | oo | o |
| Invention | 18 | | | | | | | oo | o |
| | 19 | | | | | | | oo | o |
| | 20 | | | | | | | ooo | |
| | 21 | | | | | | o | oo | |
| | 22 | | | | | | | ooo | |
| | 23 | | | | | | o | oo | |
| | 24 | | | | | | o | oo | |
| | 25 | | | | | | o | oo | |
| | 26 | | | | | | oo | o | |
| | 27 | | | | | | | ooo | |
| | 28 | | | | | | | ooo | |
| | 29 | | | | | | | ooo | |
| | 30 | | | | | | | o | oo | each o represents a test result

What is claimed is:

1. An Al-based alloy for use as sliding material, superior in both fatigue resistance and anti-seizure property, consisting, by weight, of 1-10% Zn, 1-15% Si, 0.1-5% Cu, 0.1-5% Pb, 0.005-0.5% Sr, and the balance Al and incidental impurities.

2. An Al-based alloy for use as sliding material, superior in both fatigue resistance and anti-seizure property, consisting, by weight, of 1-10% Zn, 1-15% Si, 0.1-5% Cu, 0.1-5% Pb, 0.005-0.5% Sr, 0.05-5% in total of at least one component selected from the group A consisting of 0.05-5% Mg and 0.05-5% Ni, and the balance Al and incidental impurities.

3. An Al-based alloy for use as a sliding material, superior in both fatigue resistance and anti-seizure property consisting, by weight, of: 1-10% Zn; 1-15% Si; 0.1-5% Cu; 0.1-5% Pb; 0.005-0.5% Sr; 0.05-2% in total of at least one components selected from the group B consisting of 0.05-2% Mn, 0.05-2% V, and 0.05-2% Cr; and the balance Al and incidental impurities.

4. An Al-based alloy for use as a sliding material, superior in both fatigue resistance and anti-seizure property consisting, by weight, of: 1-10% Zn; 1-15% Si; 0.1-5% Cu; 0.1-5% Pb; 0.005-0.5% Sr; 0.05-5% in total of at least one component selected from the group A consisting of 0.05-5% Mg and 0.05-5% Ni; 0.05-2% in total of at least one component selected from group B consisting of 0.05-2% Mn, 0.05-2% V and 0.05-2% Cr, the total content of said components of the group A and B being in a range of 0.05 to 4%; and the balance Al and incidental impurities.

* * * * *